United States Patent
Li et al.

(10) Patent No.: US 11,333,193 B2
(45) Date of Patent: May 17, 2022

(54) BEARING SYSTEM FOR A FIRE HYDRANT

(71) Applicant: Mueller International, LLC, Atlanta, GA (US)

(72) Inventors: Yanlong Li, Hixson, TN (US); Paul S. Gifford, Chattanooga, TN (US); Walter Pierce Wojick, Lookout Mountain, GA (US)

(73) Assignee: Mueller International, LLC, Atlanta, GA (US)

( * ) Notice: Subject to any disclaimer, the term of this patent is extended or adjusted under 35 U.S.C. 154(b) by 417 days.

(21) Appl. No.: 16/109,934

(22) Filed: Aug. 23, 2018

(65) Prior Publication Data

US 2020/0063404 A1  Feb. 27, 2020

(51) Int. Cl.
  *F16C 17/04* (2006.01)
  *E03B 9/04* (2006.01)
  *F16C 33/20* (2006.01)

(52) U.S. Cl.
  CPC .............. *F16C 17/04* (2013.01); *E03B 9/04* (2013.01); *F16C 33/201* (2013.01); *F16C 2202/50* (2013.01); *F16C 2202/54* (2013.01); *F16C 2208/60* (2013.01)

(58) Field of Classification Search
  CPC .......... F16C 17/04; F16C 17/08; F16C 17/26; F16C 33/20; F16C 33/201; F16C 2208/60; F16C 2202/54
  See application file for complete search history.

(56) References Cited

U.S. PATENT DOCUMENTS

| 4,932,795 | A | * | 6/1990 | Guinn | B63H 20/00 384/276 |
| 5,607,249 | A | * | 3/1997 | Maughan | B62D 7/16 403/120 |
| 8,640,728 | B2 | * | 2/2014 | Sigelakis | E03B 9/08 137/307 |

OTHER PUBLICATIONS

American Flow Control; Product Manual for 4-1/2" American Darling Mark 73-5 Fire Hydrant, publicly available prior to Aug. 23, 2018, 28 pgs.
American Flow Control; Product Manual for 4-3/4" Waterous Trend Fire Hydrant, publicly available as early as Mar. 23, 2018, 35 pgs.
American Flow Control; Product Manual for 5-1/4" American Darling B-62-B-5 Fire Hydrant, publicly available prior to Aug. 23, 2018, 28 pgs.
American Flow Control; Product Manual for 5-1/4" American Darling B-84-B-5 Fire Hydrant, publicly available prior to Aug. 23, 2018, 28 pgs.
AMERICAN; Article entitled: "4½" American-Darling® Mark 73-5, located at <http://www.american-usa.com/products/valves-and-hydrants/fire-hydrants/4-1-2-america . . . >, accessed on Nov. 13, 2018, 1 pg.

(Continued)

*Primary Examiner* — James Pilkington
(74) *Attorney, Agent, or Firm* — aylor English Duma LLP

(57) ABSTRACT

A bearing system includes a first bearing, the first bearing being annular in shape and defining a ring aperture, the first bearing including a first surface and a second surface, a second bearing being substantially the same in construction to the first bearing, a first surface of the second bearing contacting a second surface of the first bearing, wherein each of the bearings is constructed of nylon MDS.

6 Claims, 4 Drawing Sheets

(56) References Cited

OTHER PUBLICATIONS

AMERICAN; Article entitled: "4¾" Waterous® Trend, located at <http://www.american-usa.com/products/valves-and-hydrants/fire-hydrants/4-3-4-waterous . . . >, accessed on Nov. 13, 2018, 1 pg.

AMERICAN; Article entitled: "5¼" American-Darling B-62-B-5, located at <http://www.american-usa.com/products/valves-and-hydrants/fire-hydrants/5-1-4-america . . . >, accessed on Nov. 13, 2018, 1 pg.

AMERICAN; Article entitled: "Fire Hydrants—American—The Right Way", located at <http://www.american-usa.com/products/valves-and-hydrants/fire-hydrants>, accessed on Nov. 9, 2018, 6 pgs.

Article entitled: "5¼" American-Darling B-84-B-5, located at <http://www.american-usa.com/products/valves-and-hydrants/fire-hydrants/american-darlin . . . >, accessed an Nov. 9, 2018, 1 pg.

Clow Canada: Article entitled: "Fire Hydrants Clow Canada", publicly available prior to Aug. 23, 2018, 2 pgs.

Clow Canada; Specification Sheet for "Bibby Sentinel FM & ULC Approved", publicly available prior to Aug. 23, 2018, 1 pg.

Clow Valve Co.; Brochure for Eddy Fire Hydrant, publicly available prior to Aug. 23, 2018, 8 pgs.

Clow Valve Company; Specification Sheet for "F-2640 Eddy Fire Hydrant", publicly available prior to Aug. 23, 2018, 4 pgs.

Clow Valve; Article entitled: "Hydrants", located at <http://www.clowvalve.com/products/catalog/hydrants/> , accessed on Nov. 13, 2018, 1 pg.

Kennedy Valve Co.; Article entitled: "Hydrants", located at <http://www.kennedyvalve.com/products/catalog/hydrants/?>, accessed on Nov. 13, 2018, 1 pg.

Kennedy Valve; Brochure for "Returning Home with the Kennedy K81V Vintage Hydrant", published Feb. 14, 2012, 4 pgs.

Kennedy Valve; Brochure for "The Kennedy Guardian", published Feb. 14, 2012, 18 pgs.

M&H Valve Company; Brochure for "Style 929 Fire Hydrant", published Sep. 2012, 11 pgs.

M&H Valve Company; Brochure for 129 Hydrant, published Sep. 2012, 17 pgs.

M&H Valve; Article entitled: "Hydrants", located at <http://www.mh-valve.com/products/catalog/hydrants/>, accessed on Nov. 13, 2018, 1 pg.

SENTINEL; Brochure for Sentinel Hydrant, publicly available prior to Aug. 23, 2018, 5 pgs.

* cited by examiner

BEARING SYSTEM FOR A FIRE HYDRANT

TECHNICAL FIELD

This disclosure relates to water products. More specifically, this disclosure relates to municipal water control.

BACKGROUND

Fire hydrants supply water for fire relief in a variety of municipal water supply applications. Operation of a fire hydrant can be hindered when parts on the fire hydrant do not work as intended. Additionally, some parts can be expensive to produce and add additional costs.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A bearing system includes a first bearing, the first bearing being annular in shape and defining a ring aperture, the first bearing including a first surface and a second surface, a second bearing being substantially the same in construction to the first bearing, a first surface of the second bearing contacting a second surface of the first bearing, wherein each of the bearings is constructed of nylon MDS.

A fire hydrant includes an upper barrel, the upper barrel being hollow and defining a cavity therein, the upper barrel defining at least one nozzle; a bonnet system comprising a bonnet, the bonnet fastened to an upper end of the upper barrel, the bonnet being of a shape to encapsulate the upper barrel and defining a cavity therein; a stem located within the cavity of the upper barrel, the stem arranged extending into the cavity of the barrel, the stem in mechanical connection with a valve; an op nut mechanically coupled to the stem in arrangement to cause linear motion of the stem to operate the valve; and at least one bearing system arranged between the op nut and the bonnet system, each bearing system comprising at least one bearing, wherein each bearing is constructed of nylon MDS.

A method of lubricating the mechanical functioning of a fire hydrant includes the steps of obtaining a fire hydrant, the fire hydrant comprising an upper barrel, the upper barrel being hollow and defining a cavity therein, the upper barrel defining at least one nozzle; a bonnet system comprising a bonnet, the bonnet fastened to an upper end of the upper barrel, the bonnet being of a shape to encapsulate the upper barrel and defining a cavity therein; a stem located within the cavity of the upper barrel, the stem arranged extending into the cavity of the barrel, the stem in mechanical connection with a valve; and an op nut mechanically coupled to the stem in arrangement to cause linear motion of the stem to operate the valve; obtaining a bearing system, the bearing system comprising a plurality of bearings in successive contact such that at least one planar surface of each bearing is in contact with at least one planar surface of another bearing, each bearing being constructed of nylon MDS; and arranging the baring system between the bonnet and the op nut. Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
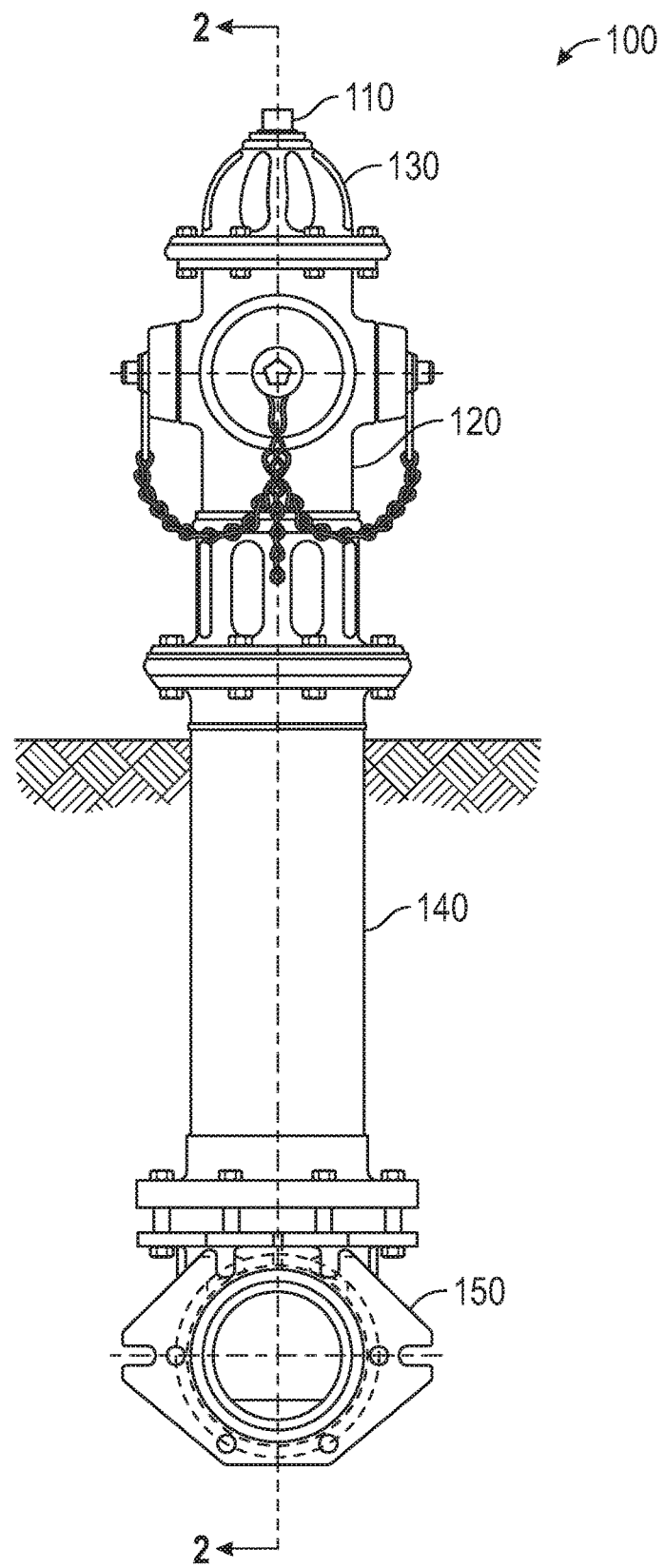
FIG. 1 is a front side view of a fire hydrant in accord with one aspect of the disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a friction-reducing washer and associated methods, systems, devices, and various apparatus. It would be understood by one of skill in the art that the disclosed washer is described in but a few exemplary embodiments among many. No particular terminology or description should be considered limiting on the disclosure or the scope of any claims issuing therefrom.

One embodiment of a fire hydrant 100 is disclosed and described in FIG. 1. The fire hydrant 100 can be exemplary of a typical fire hydrant in size, shape, and function as generally understood in the art. The fire hydrant 100 can include an op nut 110 for operation and release of water pressure into an upper barrel 120. A bonnet 130 can be fastened to a top end of the upper barrel 120. The upper barrel 120 can be fastened to a lower barrel 140 which can be buried into the ground. The fire hydrant 100 as described herein can be of the type commonly referred to as "dry barrel" hydrants, in that water typically does not reside within the upper barrel 120 or the lower barrel 140 until use. The lower barrel 140 can be fastened to a shoe 150 within which water and a valve can be located to operate the hydrant 100.

Figure 2:
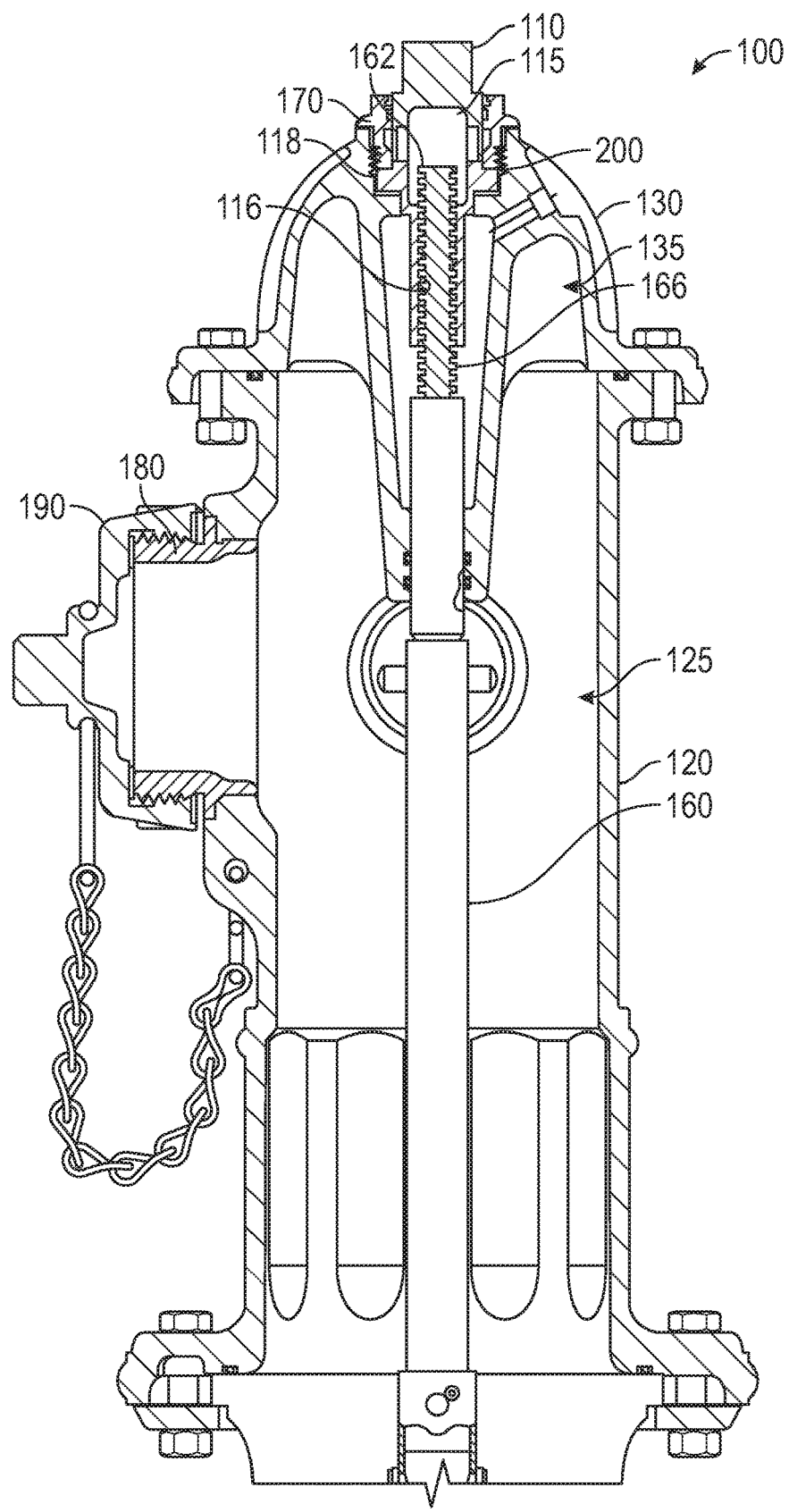
FIG. 2 is a cross-sectional view of the fire hydrant of FIG. 1 taken along line 2-2.

As seen with reference to FIG. 2, the bonnet 130 can define an interior cavity 135 and the upper barrel 120 can define an interior cavity 125. A stem 160 can be located within the cavity 125 and can serve as a junction between the op nut 110 and the valve located within the shoe 150. In operation, the valve located within the shoe 150 can be operated to allow water within the fire hydrant 100 by rotation of the stem 160 through actuation of the op nut 110. An upper end 162 of the stem 160 can comprise a threaded surface 166. A hold down nut 170 can be threadedly connected to the bonnet 130 to enclose the assembly of the op nut 110 with the upper end 162 of the stem 160. The op nut 110 can define an internal cavity 115 within which a threaded surface 116 can interact with the threaded surface 166. In such an arrangement, rotation of the op nut 110 can cause the threaded engagement of the threaded surface 116 with the threaded surface 166 to propel the stem 160 in linear motion in the upward or downward direction, depending on the direction of rotation of the op nut 110 and the direction of threading of threaded surface 116 and threaded surface 166. Linear actuation of the stem 160 can cause the valve within the shoe 150 to open or to close, thereby allowing or disallowing the flow of water within the fire hydrant 100.

When water is allowed to flow within the fire hydrant 100, water can then pass through a nozzle 180 when a nozzle cap 190 is removed. The nozzle 180 can be connected to a fire hose or to a fire engine to supply water for firefighting. In typical operation, the nozzle cap 190 is removed and the fire hose or other connection is made to the nozzle 180 before water is allowed to pass into the fire hydrant 100.

In typical arrangement, water pressures within the fire hydrant 100 can be quite high, as fire hydrants such as fire hydrant 100 are connected directly to municipal water supply lines. Municipal water mains can exceed 200 psi of pressure, and hydrants can be connected directly to main lines. As such, the valve located in the shoe 150 of the hydrant 100 must be engaged tightly to avoid inadvertent flow of water into the fire hydrant 100. Additionally, in order to release water into the fire hydrant 100, the tight engagement of the valve within the shoe 150 can result in very high torques needed to operate the op nut 110. As a result of all of this, static and dynamic forces within the fire hydrant 100 can be quite high in certain cases. In order to maintain tight sealing of the valve, the op nut 110 can often be tightened to extreme torques, which can lead to very high forces within the hydrant. Further, when opening the valve, the stem 160 can be required to force its way against over 200 psi of pressure in the line. As such, linear forces on the stem as translated into the op nut 110 and hold down nut 170 can be extremely high. In fact, because of the linear forces involved, frictional force between the op nut 110 and the hold down nut 170 can be a limiting or even disabling aspect of the system.

As a result, fire hydrants such as fire hydrant 100 can include at least one bearing 200 shown with reference to FIG. 2. The bearings 200 can provide a reduction of friction between the op nut 110 and the hold down nut 170 that can allow the system to be operated with reduced torque on the op nut 110, thereby potentially defining the difference between an operational fire hydrant 100 and a nonoperational version of one. In the current aspect, a bearing 200 can be arranged between an operation flange 118 of the op nut 110 and the hold down nut 170. In various aspects, bearings such as bearing 200 can be arranged between the operation flange 118 and the bonnet 130. In various aspects, bearings such as bearing 200 can be arranged between the hold down nut 170 and the bonnet 130. In various aspects, bearings such as bearing 200 can be arranged elsewhere to reduce friction between sliding elements in the fire hydrant 100.

Figure 3:
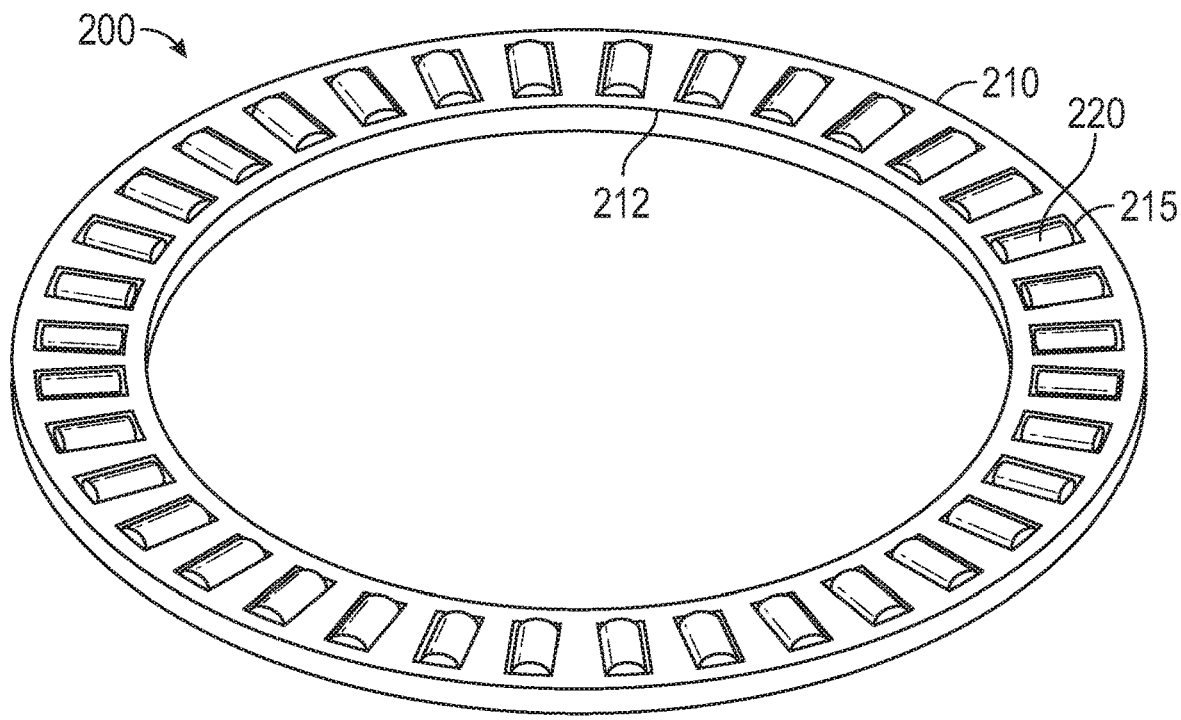
FIG. 3 is a perspective view of a bearing of the fire hydrant of FIG. 1.
Figure 4:
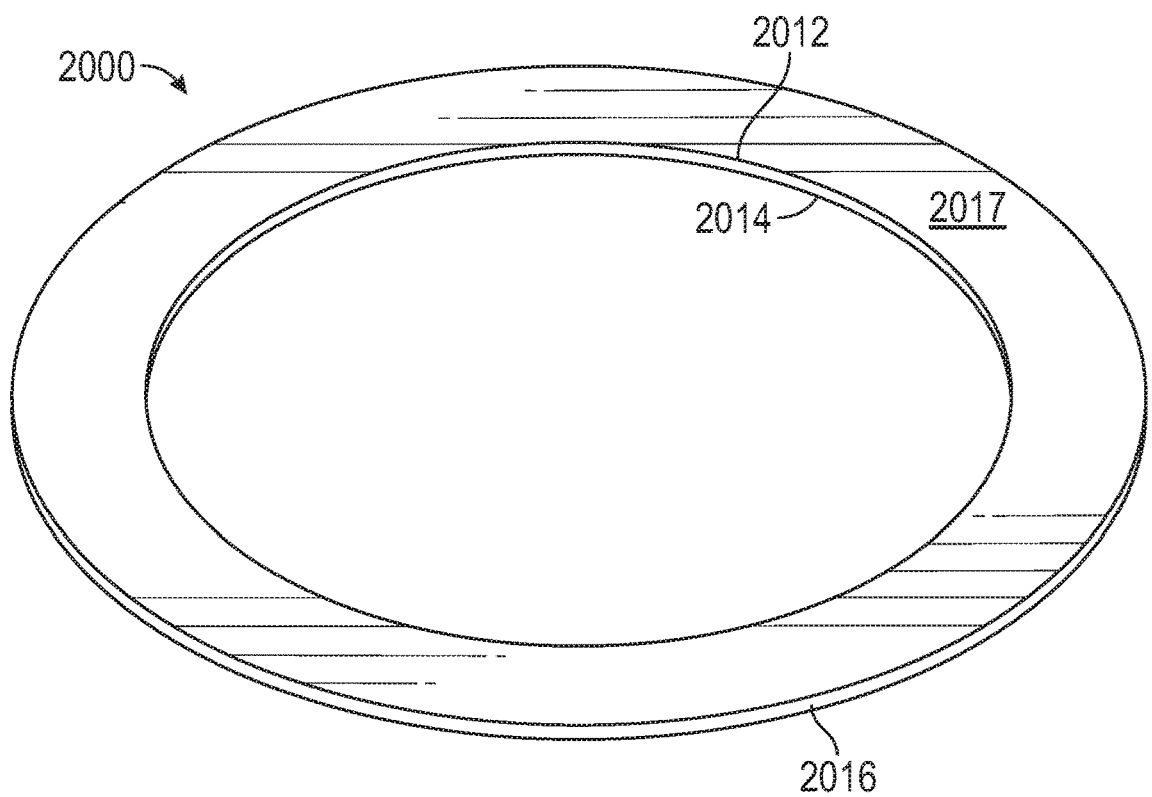
FIG. 4 is a perspective view of a bearing in accord with one aspect of the fire hydrant of FIG. 1.

Variations of bearings 200 can be utilized. One example of such a bearing 200 can be seen with reference to FIG. 3. The bearing 200 as shown can comprise a ring body 210 defining a ring aperture 212. The ring body 210 can define a plurality of apertures 215. Within each aperture 215 can be located a captured roller 220. The rollers 220 can be arranged around the bearing 200 and located to provide rolling engagement on both sides of the bearing. For example, the rollers 220 can be defined as hollow cylinders in various aspects and can be situated on a pin that is connected to the ring body 210 through the hollow of each roller 220. In various aspects, the rollers 220 can be solid cylinders with body dimensions sufficient to be captured within the ring body 210. Regardless, the rollers 220 provide rolling engagement to reduce friction.

However, the bearing 200 is not without faults. First, in order for such a design to be viable, it likely needs to be made of metal. In various aspects, steels or other similar strength metals can be used. However, ferrous materials in aqueous environments can be subject to corrosion in various applications. Corrosion can reduce the effectiveness of a bearing that is meant to provide a reduced friction engagement, as corrosion typically increases friction and reduces effectiveness and strength of a metal object. Further, production of such a bearing as bearing 200 can be expensive and can introduce a high cost to the fire hydrant 100. Making a bearing 200 from non-ferrous metals of sufficient strength can be of even higher cost.

An improved bearing 2000 can be produced to replace bearing 200 and to alleviate some of the problems with bearing 200. The bearing 2000 can be thinner than the bearing 200 and can be, for example and without limitation, about half the thickness of bearing 200. The bearing 2000 can be an annular ring defining a ring aperture 2012. The ring aperture 2012 can be defined by an inner surface 2014. The bearing 2000 can also define an outer surface 2016. The bearing 2000 can define a first surface 2017 that can be planar, and the bearing 2000 can define a second surface (not shown) opposite the first surface 2017 and about the same as the first surface 2017.

In various aspects, the bearing 2000 can be made of molybdenum disulfide-filled nylon, also known as nylon MDS. Nylon MDS can be an extruded version of nylon 6/6 with added fine particles of molybdenum disulfide, which can assist in load-bearing capacity, impact resistance, wear resistance, and lubrication. Nylon MDS can comprise extruded sheets that can provide ideal thickness characteristics that other nylon mixtures lack. An undesirable thickness of the bearing 2000 can cause problems: if too thick it cannot fit between the op nut 110 and the hold down nut 170, and if too thin it can cause hydrant chattering, or undesirable vibration of the bearing 2000 and other components within the fire hydrant 100. A chart of material properties of nylon MDS suitable for use in the current aspect of bearing 2000. All strength tests at 73° F. unless stated otherwise.

TABLE 1

Nylon MDS Properties

| Property | Units | Test Method ASTM | Value |
|---|---|---|---|
| Water absorption (24 hours) | % | D570 | 1.2 |
| Water absorption (saturation) | % | D570 | 6.5 |
| Tensile strength | PSI | D638 | 12,500 |
| Flexural strength | PSI | D790 | 16,400 |
| Compressive strength (10% deflection) | PSI | D695 | 10,000 |
| Shear strength | PSI | D732 | 11,000 |
| Impact strength, notched izod | ft-lb/in | D256 | 0.8-1.0 |
| Elongation at break | % | D638 | 50 |
| Tensile modulus of elasticity | PSI | D638 | 400,000 |
| Flexural modulus of elasticity | PSI | D790 | 400,000 |
| Hardness - Rockwell and Burnell | various | D785 | R120 |
| Density | lb/in$^3$ | n/a | 0.141 |
| Coefficient of friction | None | n/a | 0.35 |
| Wear factor (K) | in-min/ft-lb-hr | n/a | 8 |
| Limiting PV | PSI FP M | n/a | 3,000 |
| Coefficient of linear thermal expansion | in/in/° F. | D696 | 5 × 10$^5$ |
| Continuous service temperature in air (max) | ° F. | n/a | 212 |
| Deflection temperature at 264 PSI | ° F. | D648 | 400 |
| Melting point | ° F. | D789 | 430 |
| Deformation under load of 2,000 PSI at 122° F. | % | D621 | .75 |
| Dielectric strength | V/Mil | D149 | 550 |
| Dielectric constant (60 Hz) | none | D150 | 3.7 |
| Dielectric constant (1 kHz) | none | D150 | 3.7 |
| Dielectric constant (1 MHz) | none | D150 | 3.7 |

Figure 5:
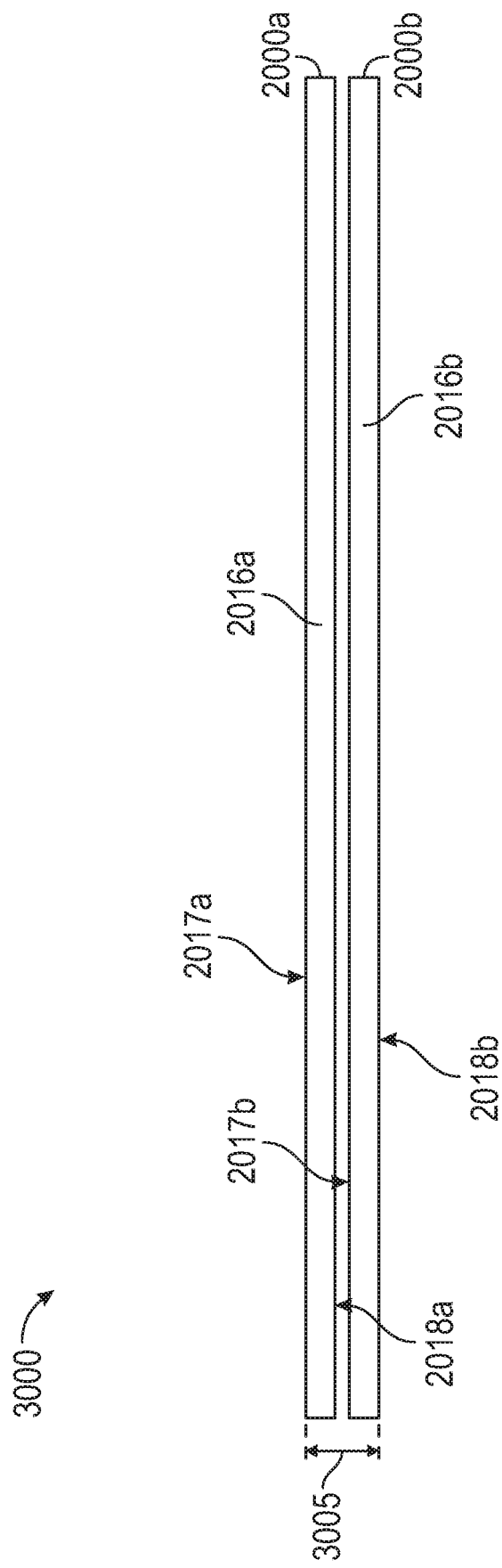
FIG. 5 is a side view of a bearing system in accord with one aspect of the fire hydrant of FIG. 1.

In one aspect, as seen with reference to FIG. 5, a bearing system 3000 can comprise two individual bearings 2000 (labeled as 2000a and 2000b) being aligned such that the ring aperture of the first bearing 2000a is arranged in alignment with the ring aperture of the second bearing 2000b. The bearings 2000a,b can be arranged such that the first surface 2017b of the bearing 2000b is arranged to contact the second surface 2018a of the bearing 2000a in the fire hydrant 200 between the op nut 110 and the hold down nut 170. Just as bearing 2000 defines outer surface 2016, bearing 2000a defines outer surface 2016a and bearing 2000b defines outer surface 2016b. Because, as previously mentioned, the thickness of the bearing 2000 can be about one-half of the thickness of the bearing 200, a thickness 3005 of the bearing system 3000 as measured between the first surface 2017a of the bearing 2000a and the second surface 2018b of the bearing 2000b can about equal to the thickness of the bearing 200. As such, in fire hydrants—such as the fire hydrant 100 as shown in FIG. 2—the bearing system 3000 can be substituted for bearing 200.

The bearing system 3000 can produce a lubricated interaction when in sliding rotation that mimics, if not exceeds, the performance of the bearing 200. In particular, the nylon MDS construction of each bearing 2000 allows the surface interaction of bearing 2000 a with bearing 2000 b to be in sliding friction of a very low amount. Because of the introduction of the molybdenum disulfate, each bearing 2000 can sustain the loads placed on the system by the op nut 110, the hold down nut 170, and the stem 160 without failure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A bearing system comprising:
a first bearing, the first bearing being annular in shape and defining a ring aperture, the first bearing including a first surface and a second surface,
a second bearing being substantially the same in construction to the first bearing, a first surface of the second bearing contacting a second surface of the first bearing,
wherein each of the bearings is constructed of nylon MDS.

2. The bearing system of claim 1, wherein the nylon MDS is extruded nylon 6/6.

3. The bearing system of claim 1, wherein the nylon MDS has a coefficient of friction of 0.35.

4. The bearing system of claim 1, wherein the nylon MDS has a Rockwell hardness of R120.

5. The bearing system of claim 1, wherein the nylon MDS has a density of 0.141 pounds per in$^3$.

6. The bearing system of claim 1, wherein the second surface of the first bearing being a planar surface and the first surface of the second bearing being a planar surface, and wherein the planar second surface of the first bearing is in contact with the planar first surface of the second bearing.

* * * * *